Aug. 7, 1962 R. G. RUDNESS 3,048,060
METHOD OF MAKING ARTICLES HAVING INTERNAL SURFACE OF DESIRED
CONTOUR AND ARTICLES PRODUCED THEREBY
Filed March 25, 1957

INVENTOR.
ROBERT G. RUDNESS
BY William F. Mesinger
ATTORNEY 3,048,060
METHOD OF MAKING ARTICLES HAVING INTERNAL SURFACE OF DESIRED CONTOUR AND ARTICLES PRODUCED THEREBY
Robert G. Rudness, Indianapolis, Ind., assignor to Union Carbide Corporation, a corporation of New York
Filed Mar. 25, 1957, Ser. No. 648,265
2 Claims. (Cl. 76—107)

This application is a continuation-in-part of application Serial No. 377,030, filed August 28, 1953, now abandoned.

The present invention relates to a method of fabricating shaped hollow articles having an internal surface of desired contour and to such articles produced thereby.

Articles having internal surfaces with special properties, such as substantially unmachinable surfaces have long been required for numerous industrial uses, such as dies in powder metallurgy. Heretofore, no satisfactory method has been disclosed whereby such internal surfaces can be easily fabricated. Attempts have been made to produce by sintering internal hard surfaces supported by suitable back-up metal, but such attempts have resulted in processes which were both extremely complicated and time consuming. The difficulties are greatly increased where the internal surface to be fabricated is of intricate contour.

It is, therefore, the main object of the present invention to provide a simple and speedy method for fabricating internal surfaces of articles independent of the intricacy of the surface contour and articles produced thereby.

More specifically it is among the objects of the present invention to provide articles having internal surfaces of desired contour on a layer of built up deposited material, such layer being either of uniform composition and of sufficient thickness to form the desired article or such layer being of desired thickness and bonded to an external back-up material to form a composite article and to provide a method of producing such articles.

Other objects will be apparent from the following description and appended claims.

The drawing illustrates in stepwise manner embodiments of the invention, wherein.

Figure 1:
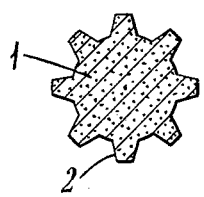
FIG. 1 is a sectional view of a temporary male master having a desired surface contour.

In accordance with one embodiment of the present invention and referring to the drawing, a temporary master 1 of aluminum or other suitable material having a melting point above about 600° F. is provided, having an external surface 2 complementary to that desired to be fabricated in deposited layer building material to form the interior surface of a die or the like. The temporary metal master is flame plated with a hard surface layer 3 of desired thickness in accordance with the method of U.S. Patent No. 2,714,563 issued August 2, 1955 to R. M. Poorman et al. In that method a comminuted material such as a hard-surface material, for example, tungsten carbide-cobalt alloy, is suspended in a detonatable mixture which is introduced into an elongated barrel of a detonation gun and ignited. The high velocity detonation wave imparts energy to the suspended particles which then pass out the barrel of the gun and are directed against a surface to be coated. Such coatings flame plated with a detonation gun have been found to have extremely low porosity and excellent strength qualities. Coatings varying from 0.0005" to 0.20" in thickness may be applied depending on the specific application. By suitable choice of materials, layers of various thicknesses and properties may be built up as desired. The layer of coating applied in this manner is held to the surface of the temporary male master by a firm mechanical bond. The depth dimension of the surface, i.e. the length perpendicular to the plane of the cross-sections shown in the attached drawing, may be of any size desired. Similarly, the cross-sections at successive points may vary as desired and in this manner very intricate internal surfaces may be fabricated in accordance with the method of the present invention.

A substantial thickness of back-up material 4, such as low carbon steel or other material, is then applied to the layer of hard surface material and built up to a thickness and contour desired as for example to a diameter equal to the inside diameter of the die holder 5 in which it is to be mounted. Such back-up material may be applied by flame plating or by any of the known direct metallizing processes. It has been found preferable to apply a flash coating of a molybdenum metal known as "spray-bond" to the hard surface coating before applying the back-up material thereto. The back-up coating can be machined to a finished dimension necessary for insertion into the die holder.

It has been found that the removal of the temporary master may then be accomplished by any one of several procedures depending on the composition of the master. If an aluminum master is employed it can be removed by dissolving it in a solution of sodium hydroxide into which the entire die assembly may be placed without danger of dissolution of the hard surface coating of a steel back-up material. Alternately a master of relatively lower melting point material may be employed which can be easily removed from the die by heating without affecting the die. The master may also be formed of easily deformed materials which would allow it to be forced from the die by mechanical means. Other means may also be readily conceived for removing the master from the die and it is to be understood that the invention in its broadest scope is not limited to a particular method of removal.

When the temporary master has been removed the interior hard-surfaced surface 6 of the desired shape is exposed and may be finished and polished as required.

It has also been found that the cooling of the applied back-up metal develops internal stresses in the assembly of male master, tungsten carbide layer, and back-up layer. These stresses cannot be relieved by the immediate shrinking of the back-up layer because of the presence of the male master which restrains shrinking. However, when the male master in later removed to expose the internal carbide surface the back-up layer may then shrink causing a shrinkage in dimensions of the internal hard-surfaced surface. Because of this shrinking the male master should ordinarily be made slightly larger in diameter than the internal hardsurfaced surface sought to be fabricated.

One example of an operation in accordance with the method of the present invention is as follows:

A die required the application of a hard-surface material female surface in the shape of a circular hole 0.5000 inch in diameter and 1.0 inch in length. An aluminum rod 2.0 inches in length was machined to 0.5015 inch in diameter. A smooth internal surface was desired on the die and the aluminum rod was, therefore, lapped down to a diameter of 0.5005 inch. The male master was then given a uniform coating of a flame plated tungsten carbide composition to a thickness of 0.004 inch. The back-up layer of low carbon steel was then applied with a metallizing gun over the layer of flame plated tungsten carbide to a uniform thickness of 3/16 inch. The part was then placed in a lathe and machined down to a total outer diameter (including aluminum male master, flame plated tungsten carbide layer and metallized low carbon steel coating) of 0.7585 inch. The piece was then cut with a resinoid bonded diamond wheel using an excess of water as a coolant so that only a 1.0 inch section remained. The die insert was then chucked in a lathe and the majority of the male master removed by drilling. Then the insert was replaced in a solution of 30% sodium hydroxide until the remainder of the male master was dissolved. The internal surface of the die insert may be polished with diamond dust, if desired.

The resulting die insert was suitable for force mounting in a die holder of standard 0.756 inch inside diameter with a 1.0 inch die insert cavity. The resulting die was found to have excellent performance characteristics.

Figure 2:
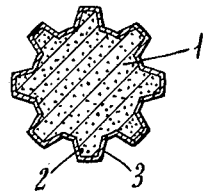
FIG. 2 is a sectional view of the master coated on its die surfaces with a deposited layer building material.
Figure 3:
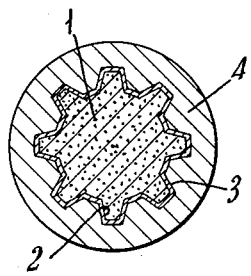
FIG. 3 is a sectional view of the coated master of FIG. 2 to which a back-up coating of metal has been added in thickness to correspond to the inside diameter of a die holder.
Figure 4:
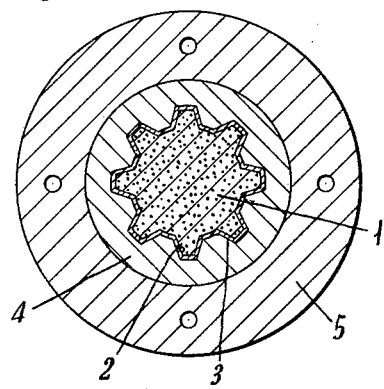
FIG. 4 is a sectional view of the coated master having the back-up coating of FIG. 3 and inserted in a die holder.
Figure 5:
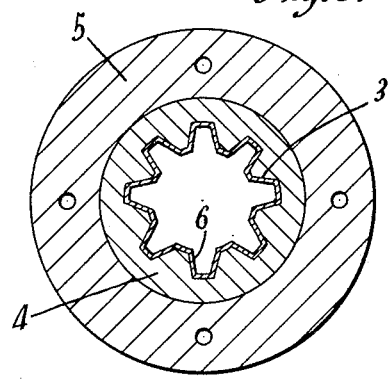
FIG. 5 is a sectional view of the assembly of FIG. 4 showing the finished article with the temporary master removed.
Figure 6:
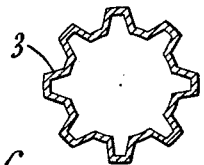
FIG. 6 is a sectional view of an alternative body produced by removing the temporary master after the stage shown in FIG. 2.

An alternative method may be employed to produce a unitary article having a body of layer built deposited material with internal surfaces of desired predetermined contour by supplying a master as in FIG. 1 and depositing a desired thickness of material in layers to form the intermediate stage shown in FIG. 2 substantially as previously described. The master 1 is then removed by melting or solution or other suitable procedure and the desired article sectionally shown in FIG. 6 results.

The methods of this invention are particularly advantageous for producing articles which are difficult or impractical to produce by casting, electroplating, spraying or the like.

The articles produced according to the invention employing deposited-layer-building material are characterized by a structure having closely and tightly adherent particulate elements which are impacted and lamellar in shape. Such deposited layers have less than about 3% porosity and a bulk density substantially equal to solid material of the same composition.

Preferably the composition employed contains at least 70% by weight of one or a mixture of refractory materials chosen from the group consisting of metals, metal carbides, metal borides, metal nitrides, metal oxides, and metal silicides and may also contain up to about 30% by weight of at least one bonding metal selected from metals and alloys which are capable of bonding the particles of the selected material of the group.

Specific examples of such materials are set forth in copending application Serial No. 515,484 filed June 14, 1955, R. M. Poorman et al., since matured into Patent No. 2,964,420, dated December 13, 1960.

While the fabrication of dies having hard-surfaced internal surfaces has been shown hereinabove by way of example, it is to be understood that the invention may be employed to fabricate various articles wherein special internal surfaces are desired.

What is claimed is:
1. Method of fabricating metal articles having an internal surface of built-up deposited layer material consisting essentially of refractory hard surfacing material comprising providing a temporary male master having an external surface of metal having a melting point over 600° F. and complementary in contour to the desired internal surface, detonating a body of gas containing particles consisting essentially of said refractory hard facing material therein, directing the products of said detonation against said external metal surface of said master, thereby applying a coating of such deposited essentially refractory hard surfaced layer material to said external surface of said temporary male master, covering said coating of deposited essentially refractory hard surfaced layer material with a suitable back-up material coating to the desired thickness to form an assembly, and removing said temporary male master from said assembly to produce an article having an internal surface of built-up deposited essentially refractory hard surfacing layer material.

2. Method of fabricating metal articles having an internal surface of built-up deposited layer of material consisting essentially of tungsten carbide composition comprising providing a temporary male master having an external surface of metal having a melting point over 600° F. and complementary in contour to the desired internal surface, detonating a body of gas containing particles consisting essentially of tungsten carbide composition, directing the products of said detonation against said external metal surface of said master, thereby applying a coating of such deposited essentially tungsten carbide composition to said external surface of said temporary male master, covering said coating of deposited essentially tungsten carbide composition with a suitable back-up material coating to the desired thickness to form an assembly, and removing said temporary male master from said assembly to produce an article having an internal surface of built-up deposited essentially tungsten carbide composition.

References Cited in the file of this patent

UNITED STATES PATENTS

| | | |
|---|---|---|
| 1,654,936 | Jones | Jan. 3, 1928 |
| 1,708,715 | Akin | Apr. 9, 1929 |
| 1,817,680 | Pratt | Aug. 4, 1931 |
| 1,912,889 | Couse | June 6, 1933 |
| 1,950,604 | Fitz-Gerald | Mar. 13, 1934 |
| 2,171,599 | Reid | Sept. 5, 1939 |
| 2,173,484 | Lerch et al. | Sept. 19, 1939 |
| 2,288,658 | Stossel | July 7, 1942 |
| 2,627,649 | Matthysse | Feb. 10, 1953 |
| 2,683,095 | Paucek | July 6, 1954 |
| 2,714,563 | Poorman et al. | Aug. 2, 1955 |

FOREIGN PATENTS

| | | |
|---|---|---|
| 84,526 | Holland | Oct. 15, 1956 |